Sept. 10, 1935.   A. G. H. STRAATMAN   2,013,995
FLOW DETECTOR
Filed Jan. 23, 1930   2 Sheets-Sheet 2

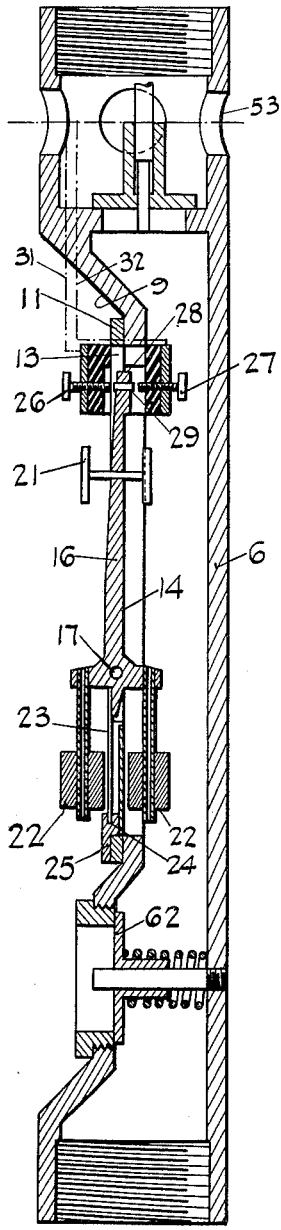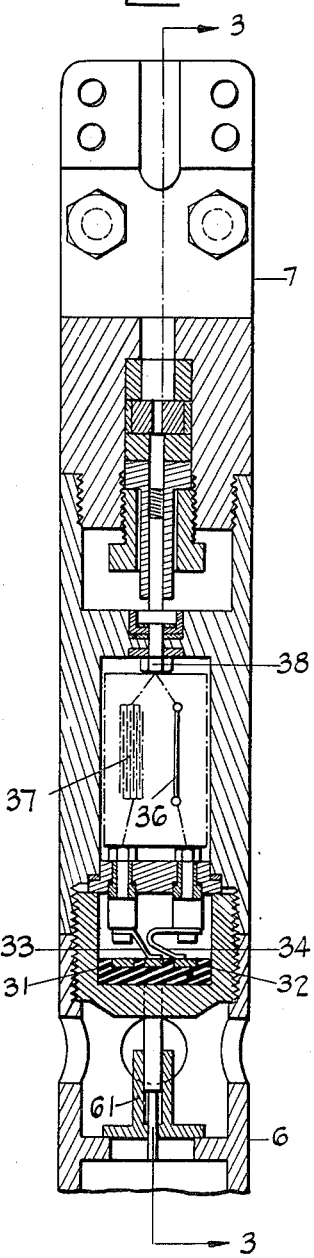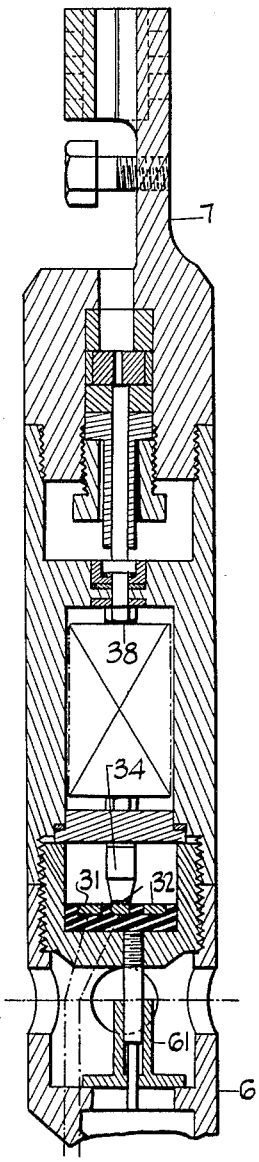

Inventor:
Alphons G. H. Straatman
by
Langner, Parry, Card & Langner
Attys.

Patented Sept. 10, 1935

2,013,995

UNITED STATES PATENT OFFICE 2,013,995

FLOW DETECTOR

Alphons Gerard Hubert Straatman, The Hague, Netherlands, assignor, by mesne assignments, to Shell Development Company, San Francisco, Calif., a corporation of Delaware Application January 23, 1930, Serial No. 422,878
In the Netherlands January 30, 1929

4 Claims. (Cl. 177—311)

This invention comprises an apparatus for determining the direction and rate of flow of a fluid confined in a bore-hole, particularly of liquids in oil wells.

The invention possesses other advantageous features which will be set forth in the following description of the form of flow detector which I have selected for illustration in the drawings forming part of the present specification. It is to be understood that I do not limit myself to the form shown since the invention, as set forth in the claims, may be embodied in a plurality of forms.

In the drawings: Figure 1 is a longitudinal section of that portion of the apparatus containing fluid flow responsive means.

Figure 2 is a longitudinal section through that portion of the apparatus which contains current varying means. This part is screwed in the part illustrated in Figure 1, and is provided with an upper extension to attach it to a rod or cable.

Figure 3 is a longitudinal section through the device along the line 3—3 of Figure 2.

Figures 4, 5, 6:
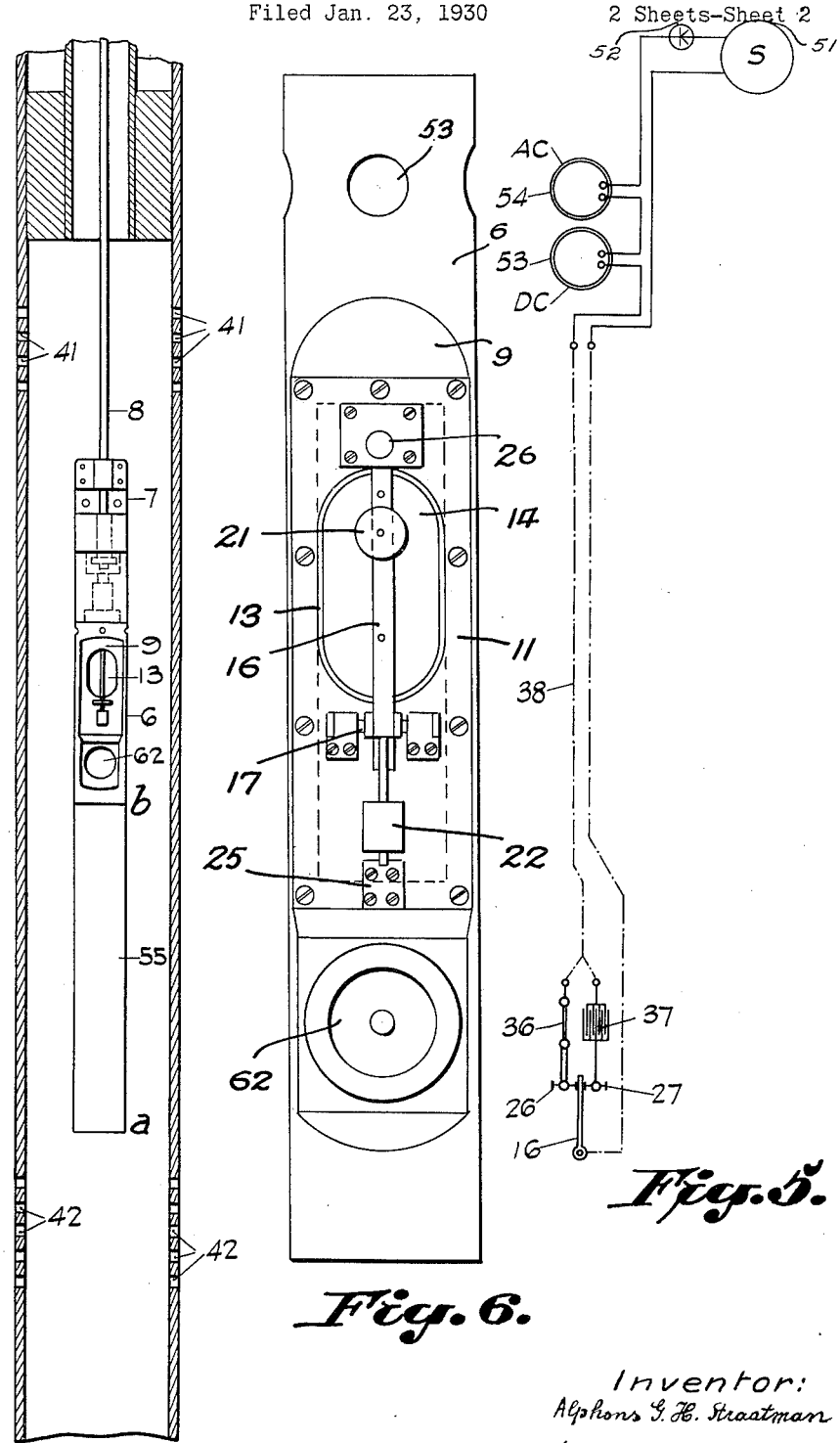
Figure 4 is a section through a shut-off bore-hole illustrating a manner of employing the device.
Figure 5 is a schematic layout of the electrical installation which is used in connection with the device.
Figure 6 is a longitudinal perspective view of Figure 1.

In that form of the apparatus which I have here disclosed a tube 6 is provided in such a manner that an extension 7 may be fastened upon it so that ready attachment can be made to a cable or rod 8 to permit of the controlled manipulation of the tube. In a recessed portion 9 of the tube an opening is provided which is closed by a plate 11. This plate which is preferably formed of copper is also provided with an aperture 13 likewise closed by plate member 14. The plate member 14 together with an arm 16 is pivotably mounted so as to be rotatable about an axis indicated at 17. The plate member 14 and arm 16 together form that device which will be later referred to as the balancing device. Adjustable weights 21 and 22 are provided in two vertical planes parallel to each other upon the plate member 14 so that disturbance of the equilibrium of the balancing device can be obviated. It is particularly important to guard against deviation of the balancing device by an influence such as gravity as when the device is required to assume a position in the bore-hole or well other than the vertical. To retain the balancing device in a substantially fixed position until a force begins to bear upon it, a small plate spring 23 is conveniently fitted into a slot 24 provided in a member 25 which is secured to the recessed tube 6.

Adjustable contact screws 26 and 27 are provided adjacent the upper end 28 of the arm so that when movement of the arm is effected in either direction, arm contact 29 will engage one of the screws 26 or 27. The respective contact screws which are insulated from the tube are connected by conductors 31 and 32 through brush contacts 33 and 34 to resistance 36 and condenser 37. The resistance and the condenser are respectively joined, in accordance with my invention, to a single insulated conductor 38 which is preferably incorporated into the rod or cable used for supporting and manipulating the device. This conductor is carried by means of the supporting cable or rod to the exterior of the bore-hole so that connection may be had to suitable apparatus. Since the arm contact on the balancing device which makes contact with the respective insulated adjustable contacts is not insulated from the frame of the tube, a circuit through the conductor 38 and through the cable or rod will be closed when the arm contact meets with either one of the insulated contact screws 26 or 27. This closing will be effected when fluid flowing in the bore-hole, in this instance between the perforations 41 and 42, causes the balancing device to move to one side or the other by reason of the pressure bearing upon the balancing device.

In accordance with my invention I provide means for ascertaining through a characteristic indication, which of the contact screws the balancing device has contacted with. This indication is made possible through my invention even tho only two conductors are employed. In this connection I preferably provide an alternating current from a source as magneto 51. The alternating current furnished is rectified by a rectifier indicated at 52. Interposed between the rectifier and the conductor 38 is a direct, current meter 53 and an alternating current meter 54. The other side of the generator is electrically joined to the supporting cable or rod.

It is well known that rectifiers of any type, such as tungar, mercury arc, electrolytic etc., do not convert an alternating current into a pure direct current, but into a pulsating direct current. In accordance with the characteristics of the current supplied when contact is made through screw 26, the circuit being completed through the resistance 36, both meters will register. However, due to the character of the current passed by the condenser 37 only the alternating current meter will be actuated when the current is closed through the screw 27, since condenser 37, being charged to a peak at the moment when the pulsating supply wave is also at a peak, discharges back its excess charge when the supply wave is at a trough, and an alternating current instead of a pulsating direct current thus flows through the circuit; the D. C. meter will therefore read zero. In this manner a positive and characteristic indication is obtained as to which of the screws contact is made with.

With the device hung in a bore-hole, as illustrated in Figure 4, the difference in pressure occasioned by fluid flow between the point a, adjacent to the open end of pipe 55 forming an extension to the tube 6 and point b, adjacent to the tube, will cause the balancing device to move to one side or the other to give the indication on the meters characteristics for an upward or downward direction of the flow. Further, by gradually raising or lowering the apparatus the rate of flow can be readily ascertained. Thus if the pressure inside the apparatus is greater than that outside, indicating an upward flow, a change in the pressure can be effected by raising the apparatus. This will at a certain speed cause a reversal in relation of the forces existing inside and outside of the balancing device. As soon as the reversal takes place the balancing device will swing about axis 17 to contact with the other screw; the rate at which the apparatus is then being raised will closely approximate the rate of flow of the fluid. A more accurate determination of the rate of flow can be made by carefully repeating the procedure.

It is also possible to readily locate various defects in the electrical control system. Thus an abnormally strong current and corresponding deviation of the two meters indicates a short circuit while the simultaneous zero registration of both meters while the magneto is working is a sign of a break in the circuit. The high voltage generated by the inductor and the sensitivity of the meters renders any contact resistances inconsequential. If one of the contacts 26 or 27 is defective the instrument can still be used for determining the direction of flow when it is known that a fluid flows between points a and b.

In some instances in operation, conditions will arise which occasion the creation of a relatively high pressure within the apparatus. To avoid damage to the relatively delicate balancing device I preferably provide two safety valves indicated at 61 and 62. On a pressure being exceeded to which the valves are set they will open and the fluid can flow freely through the apparatus thus obviating any danger from damage of the balancing device. Safety valve 61 is formed to care for an excess internal pressure while valve 62 is set to release upon an excess external pressure.

I claim:

1. An apparatus for determining the direction of flow of a fluid in a borehole, comprising: a tubular body adapted to be lowered into the borehole and positioned parallel to the flow of the fluid, means normally closing one end of the tubular body, a passage in the side of said body, a pivotally mounted vane substantially fitting the passage and responsive to a pressure transverse to the direction of flow in the borehole, and an electric means for translating the position of the vane into an indication of the direction of flow of the fluid in the borehole.

2. An apparatus for determining the direction of flow of a fluid in a borehole, comprising: a tubular body adapted to be lowered into the borehole and positioned parallel to the flow of the fluid, means normally closing one end of the tubular body, a passage in the side of said body, a pivotally mounted vane substantially fitting the passage and responsive to a pressure transverse to the direction of flow in the borehole, a contact on the vane, spaced contacts positioned on said body to engage the vane in its extreme deflected positions, and an electric means for translating the position of the vane into an indication of the direction of flow of the fluid in the borehole.

3. An apparatus for determining the direction of flow of a fluid in a borehole comprising: a tubular body adapted to be lowered into the borehole and positioned parallel to the flow of the fluid, means normaly closing one end of the tubular body, a side passage through the tubular body, a pivotally mounted vane substantially fitting the passage and parallel to the borehole, a contact on the vane, spaced insulated contacts positioned on said body to engage the vane in its extreme deflected positions, one of said contacts being connected to a source of pulsating electromotive force through a condenser and the other through a resistance, and an electric means including said source of electromotive force to translate the position of the vane into an indication of the direction of flow of the fluid in the borehole.

4. An apparatus for determining the direction of flow of a fluid in a borehole comprising: a tubular body adapted to be lowered into the borehole and positioned parallel to the flow of the fluid, means normally closing one end of the tubular body, a side passage through the tubular body, a pivotally mounted vane substantially fitting the passage and parallel to the borehole, a contact on the vane, spaced contacts positioned on said body to engage the vane in its extreme deflected positions, an electric means for translating the position of the vane into an indication of the direction of flow of the fluid in the borehole, a spring-loaded safety valve responsive to excess pressure outside the tubular body, and a spring-loaded safety valve responsive to excess pressure inside the tubular body.

ALPHONS GERARD HUBERT STRAATMAN.